United States Patent
Blakely

[15] 3,695,474
[45] Oct. 3, 1972

[54] HYDRAULIC CONTROL LINKAGE FOR IMPLEMENT

[72] Inventor: Richard P. Blakely, Rockford, Ill.
[73] Assignee: J. I. Case Company
[22] Filed: Aug. 5, 1970
[21] Appl. No.: 61,359

[52] U.S. Cl. .................214/771, 214/764, 214/763
[51] Int. Cl. ..............................................E02f 3/00
[58] Field of Search......214/140, 762, 763, 771, 777, 214/779, 772, 769, 1 CM, 764

[56] References Cited

UNITED STATES PATENTS

| | | | |
|---|---|---|---|
| 3,410,433 | 11/1968 | Brown | 214/763 |
| 3,009,590 | 11/1961 | Kampert | 214/763 |
| 2,914,202 | 11/1959 | Wagner | 214/763 |
| 3,429,471 | 2/1969 | Austin et al. | 214/763 |
| 2,883,077 | 4/1959 | Pilch | 214/763 |

*Primary Examiner*—Gerald M. Forlenza
*Assistant Examiner*—John Mannix
*Attorney*—Dressler, Goldsmith, Clement & Gordon

[57] ABSTRACT

A hydraulic circuit or linkage system for controlling the attitude of an implement relative to a fixed support while the implement is being raised and lowered relative to the support. The implement is pivoted on one end of a boom by a fluid ram having pressurized fluid supplied thereto through a control valve. The hydraulic control linkage includes a master piston and cylinder assembly interposed between the implement and the support with a slave piston cooperating with the valve spool of the control valve and slidable in a slave cylinder. The opposite ends of the two cylinders are interconnected so that the slave piston is moved in response to movement of the master piston to automatically maintain the predetermined attitude of the implement relative to a fixed reference plane. The hydraulic control linkage further includes mechanism for automatically stopping the bucket at a desired angular relation while it is moving between a first and a second maximum pivoted position and automatically preventing the movement of the bucket beyond the second maximum pivoted position. This is accomplished through a valve having a plurality of flow paths between the conduits interconnecting opposite ends of the two cylinders.

21 Claims, 5 Drawing Figures

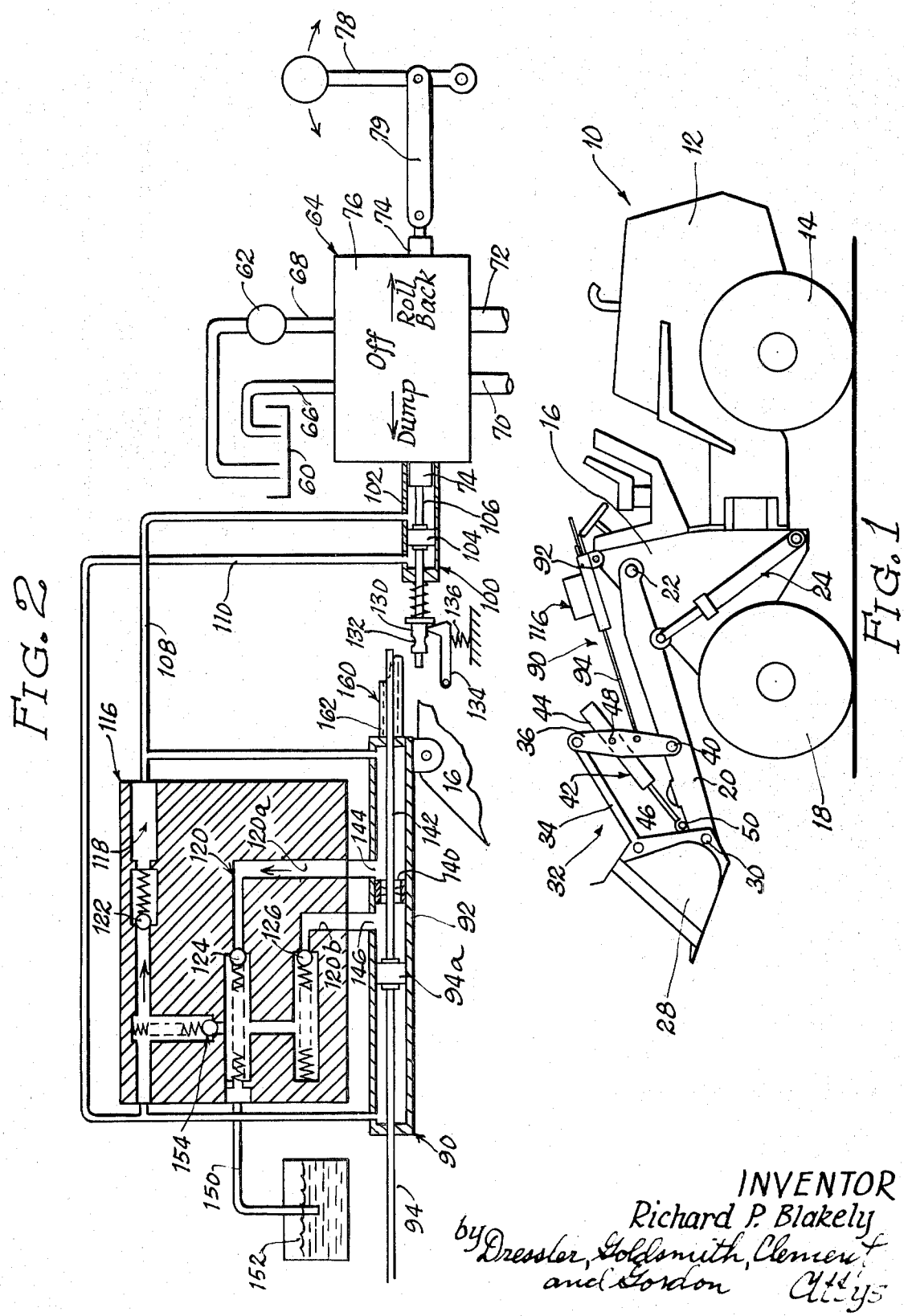

HYDRAULIC CONTROL LINKAGE FOR IMPLEMENT

BACKGROUND OF THE INVENTION

The present invention relates to the vehicle supported implements and more particularly to a control system which automatically positions an implement in any or one of a plurality of predetermined angular positions relative to a fixed reference plane.

In a typical construction of a vehicle mounted implement, the vehicle, such as a tractor, provides a support or base which has one end of a boom structure mounted for pivotal swinging movement, normally accomplished through hydraulically powered means. The opposite end of the boom structure supports an implement, such as a tilting bucket, which is normally pivoted thereon through a fluid ram or power means. In the normal operation of such a vehicle, the boom structure is moved to a lowered position, and the implement is moved to an angular position for engaging material as the tractor is driven forwardly to locate the material within the bucket. Thereafter, the boom is raised to carry the implement and the material to a height enabling dumping of the implement so as to transfer the material to another vehicle or to some other location.

In order to increase the efficiency of operation of a vehicle supported implement of this type, various types of automatic controls have been proposed so that the operator may attend to other necessary functions while the implement is being repositioned on the boom. For example, various types of linkages have been proposed for maintaining the implement at a level condition as the boom is moved between lowered and raised positions, which are often referred to as self-leveling controls. Other types of mechanisms have been proposed for automatically stopping the implement at a predetermined angle relative to a reference plane after the material has been dumped at the subsequent location, which is usually referred to as the return-to-dig position. Still further devices have been proposed for preventing the pivoting of the implement beyond a maximum angular relation relative to a reference plane to prevent the dumping of the material onto the operator or the vehicle, commonly called the anti-rollback position. However, to date no satisfactory single control unit has been proposed for performing all of the above functions without the necessity of providing mechanical connections between relatively movable elements of the material handling device.

SUMMARY OF THE INVENTION

The present invention contemplates the simple and effective hydraulic linkage interposed between the support, the implement and the control valve which supplies fluid to and from the fluid ram moving the implement relative to the support. The hydraulic linkage is capable of automatically (1) maintaining the implement at a level position while the implement is being raised and lowered relative to the vehicle; (2) automatically preventing movement of the implement beyond a maximum position; and (3) automatically returning the implement to a working position, after the material has been dumped. All of the above is accomplished without a mechanical connection between the support, implement and control valve. The hydraulic linkage includes a master piston and cylinder assembly, a slave piston and cylinder assembly and flexible conduits and a control valve interposed between the two assemblies.

More specifically, the present invention contemplates a master piston and cylinder fluid assembly having elements respectively connected to a support and an implement with the implement being pivoted on the support by a boom. The slave cylinder and piston assembly cooperates with a valve spool that is actuated to supply pressured fluid to a fluid motor which pivots the implement on the outer end of the boom. The two cylinders are interconnected by a pair of conduits having fluid therein so that movement of the implement toward and away from the support will actuate the valve spool and maintain the implement in a level condition relative to the vehicle.

A control valve is interposed between the conduit and defines first and second flow paths with relief valves in the respective paths and responsive to a first pressure of the hydraulic fluid in the respective conduits to provide flow paths in opposite directions between the conduits thereby accommodating manual actuation of the valve spool to position the implement at positions other than the level position relative to the vehicle.

The hydraulic control linkage further includes means for blocking flow in one of the paths when the implement reaches a first or maximum position to prevent manual actuation of the valve spool after the implement reaches the maximum position. In addition, one of the flow paths is divided into first and second branch paths with a relief valve in each branch path. The relief valve in the second branch path is responsive to a greater pressure than that in the first branch and the first branch path is blocked when the implement reaches a working position relative to the support while both branch paths are blocked when the implement reaches the maximum position to prevent actuation.

With the hydraulic control linkage or circuit of the present invention interposed between an implement, a support and a valve spool controlling the implement, the implement will automatically be maintained in a leveled condition as the implement is raised and lowered relative to the vehicle. In addition, to position the implement to a working position from a dumped position, the operator need only move the valve spool of the control to a detented position and the control linkage will automatically stop the implement at the working position. Furthermore, the hydraulic control linkage is arranged in a manner that the operator may manually override the automatic control to move the implement beyond the working position, after the implement has been filled with material.

BRIEF DESCRIPTION OF SEVERAL VIEWS OF DRAWINGS

FIG. 1 shows a vehicle mounted implement having the present invention incorporated therein;

FIG. 2 is a schematic illustration of the hydraulic control circuit of the present invention;

DETAILED DESCRIPTION

Figure 3:
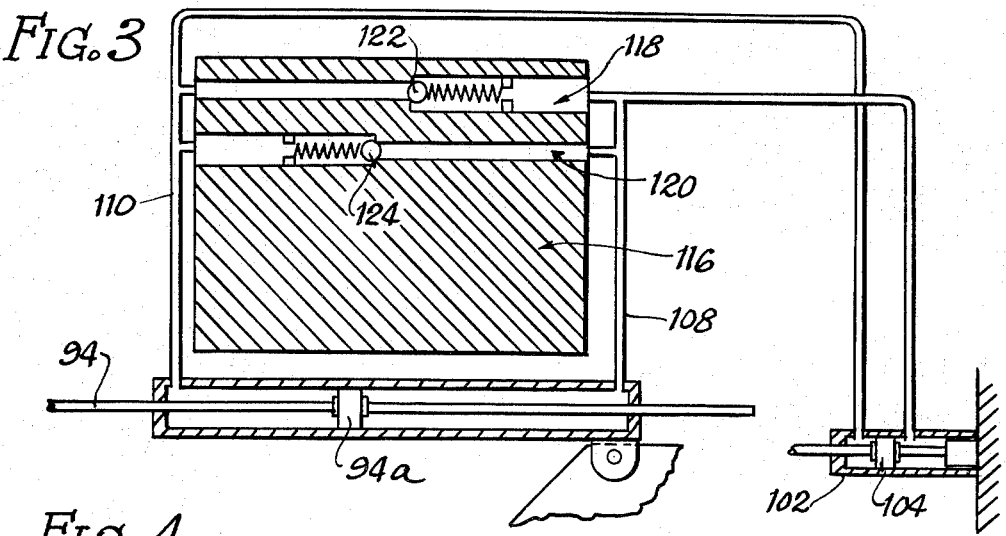
FIG. 3 is a fragmentary schematic illustration of the hydraulic control circuit illustrating elements required for performing one function of the control.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings discloses an earthworking implement 10, such as "front end loader" of the articulated type. The loader 10 includes a power section 12 supported on a pair of wheels 14 (only one being shown) and pivotally connected at one end to a loader support section 16, also supported on a pair of wheels 18 (only one being shown). The sections 12 and 16 combine to define a vehicle with the section 16 having the loader structure supported thereon. The loader structure includes a boom or a pair of lift arms 20 (only one being shown) having their adjacent ends pivoted at 22 on a fixed support defined by the section 16. The lift arms 20 are adapted to be raised and lowered through fluid rams 24 (only one being shown) pivoted at one end on the section or support 16 and respectively connected at the opposite end to the lift arms by pivot pins spaced from the pivot pins 22.

An implement or bucket 28 is pivotally supported at 30 adjacent to the free end of the lift arms and is adapted to be pivoted between first and second positions through hydraulically operated linkage mechanism 32, which will now be described.

A hydraulically actuated linking mechanism consists of a compound linkage including links 34 and 36 pivotally interconnected at one end, with the link 34 being pivoted on the bucket 28 at a location spaced from the pivot pin 30 while the free end of the link 36 is pivoted at 40 on the lift arms or boom, also at a location spaced from the pivot pin 30. While two such linkages are included, only one has been shown for purposes of illustration.

The hydraulically operated linkage mechanism further includes fluid rams 42 (only one being shown) each consisting of a cylinder 44 and a piston rod 46 with the cylinder being trunion mounted at 48 on the link 36 while the piston rod 46 is pivotally supported on the boom at 50. Thus, portions of the lift arms 20 and the bucket 28 cooperate with the link 34 and 36 to define a parallel linkage system, the configuration of which is changed by extension and retraction of the piston rods relative to the cylinders to move the bucket between the first and second positions.

To extend and retract the piston rods, the hydraulic means further includes a reservoir 60, a pump 62 and a control valve 64. The control valve is connected to the reservoir through a conduit 66 while the pump 62, the reservoir 60 and the valve 64 are interconnected through a conduit 68. Thus, movement of the valve spool 74 in opposite directions from a neutral position will place the respective conduits 66 and 68 in communication with conduits 70 and 72 connected to opposite ends of the cylinders 44.

The control valve 64 may be of a commercially available type in which the valve spool 74 is biased to a neutral position within a housing 76 and actuated by a manual control lever 78 connected to the valve spool through a linkage 79. Since all of these elements are of the commercially available type, no detailed description thereof is to be necessary.

According to the present invention, a hydraulic control circuit or linkage means is interposed between the valve spool 74, the section or support 16 and the implement 28 and is capable of automatically maintaining the implement at a predetermined angle relative to a fixed referenced plane during raising of the boom; preventing movement of the implement beyond a first maximum angle relative to a fixed referenced plane; and returning the implement to a desired angle relative to the fixed referenced plane after the implement has been moved to a second maximum angle. All of the above is accomplished by the use of a minimum number of parts and the use of hydraulic fluid as a linkage between a control valve spool and the implement allows for the use of flexible hosing to eliminate the need for mechanical connections between the various elements.

According to the present invention, the hydraulic circuit or linkage includes a piston rod and cylinder assembly 90 having its first element or cylinder 92 pivotally connected to the support 16 and its second element or piston rod 94 pivotally connected to the implement or bucket 28. In the illustrated embodiment, the piston rod 94 is connected to the bucket 28 through the parallelogram linkage 34, 36. However, the piston rod could readily be connected directly to the bucket 28 and may be considered as such for the purposes of the present invention.

The hydraulic circuit of the present invention further includes a slave cylinder and piston assembly or arrangement 100 having a cylinder 102 attached directly to the valve housing 76 to define a chamber adjacent the valve spool 74. A piston 104 is slidably disposed within the chamber 102 and is connected to move with the valve spool 74 through an extension or rod 106.

Opposite ends of the master cylinder 92 and the slave cylinder 102 are interconnected by a pair of conduits 108 and 110. Thus, with an incompressible fluid, such as oil, in the conduits 108 and 110 as well as the cylinders 92 and 102, pivotal movement of the implement or bucket 28 toward and away from a support 16 forming part of the vehicle, will move the piston 104 and the valve spool 74 in appropriate directions in response to movement of the piston or element 94a by transmitting fluid through either of the conduits 108 or 110 and automatically maintain the bucket at a predetermined angular relationship relative to a fixed referenced plane.

According to a further aspect of the present invention, the predetermined angular relationship relative to the fixed referenced plane, can readily be set by the operator of the vehicle. For this purpose, the hydraulic circuit of the present invention further includes valve means between the conduits 108 and 110 and defining first and second flow paths with relief valves in each of the paths. The relief valves are responsive to a first pressure of the hydraulic fluid in the closed circuit between the cylinders 92 and 102 and are capable of being opened by supplying a pressure to the fluid through the manual control lever 78 and the valve spool 74. This arrangement allows for flow in the opposite directions between the two conduits to accommodate manual actuation of the valve spool. Stated another way, the valve means allows the valve spool 74 and the piston 104 to remain in a manually actuated position by accommodating relative movement of the elements 92 and 94 while the slave piston 104 is in a fixed position.

The control valve 116 for accomplishing the above incorporates first and second flow paths 118 and 120 interconnecting the respective conduits with the first flow path 118 having biased valve means or a pressure responsive relief valve 122 in the path limiting flow of fluid therethrough in a direction from the conduit 110 to the conduit 108. Likewise, the second flow path 120 has biased valve means or a pressure responsive relief valve 124 normally blocking flow through the flow path and limiting the flow of fluid from conduit 108 to conduit 110.

The relief valves 122 and 124 are adapted to be opened when the pressure of the fluid in the closed hydraulic system defined by the cylinders 92 and 104 and the conduits 108 and 110 exceeds a first pressure level. This pressure level is relatively low so that a small amount of manual force applied to the control lever 78 in either direction from its neutral position will increase the pressure of the fluid in the appropriate conduits 108 or 110 and open the respective relief valves 122 or 124. With such an arrangement the opening of the relief valves and holding the control in an actuated position will allow the operator to override the automatic control described above and to hold the valve spool 74 and piston 104 in a fixed position while the appropriate relief valves 122 and 124 will accommodate flow of fluid between the conduits 108 and 110 and allow relative movement of the element 92 and 94 of the master fluid ram 90.

As was indicated above, the hydraulic circuit also includes means for automatically preventing movement of the implement beyond a first maximum angle relative to the fixed referenced plane and for automatically returning the implement to a predetermined desired angle relative to said referenced plane after the implement has been moved to a second maximum angle. With particular reference to a bucket, the first maximum angle or position described above, may be defined as the "anti-rollback" angle beyond which the bucket should not be tilted; and the predetermined desired angle would generally be considered the working or return-to-dig angle or position for the bucket.

For this purpose, the second flow path 120 has first and second branch paths 120a and 120b with branch path 120a having the relief valve 124 disposed therein while the branch path 120b has a further relief valve or biased valve means 126 disposed therein. The relief valve 126 is responsive to being opened at a second pressure which is greater than the pressure required for opening valve 124, as will be described later.

In addition, the control valve spool 74 has a detented position for moving the implement or bucket from the dumped or first position to the maximum rollback or second position. Such mechanism may be incorporated directly within the valve, as is well-known in the art and will be schematically described in connection with FIG. 2. Thus, the valve spool has a further extension 130 thereon with a groove or recess 132 in the extension. A pawl or detent 134 is biased into engagement with the extension 130 by a compression spring 136 so that the end of the pawl will be received in the groove 132 and hold the valve 74 in a detented operative position. The pressure of the fluid required in the closed loop fluid circuit to overcome the force of the spring 136 is less than the pressure of the fluid required to open the relief valve 126, for a purpose which will be described. While the detent mechanism has been schematically illustrated externally of the valve 64 it may readily be and usually is incorporated within the housing.

The hydraulic control circuit further includes means for blocking the flow through the first branch 120a of the flow path 120 when the implement is pivoted to an intermediate angle between the first and second maximum angles. In the illustrated embodiment, the means for blocking flow includes a sleeve 140 carried by an extension 142 extending from one side of the piston 94a while the first branch path 120a communicates with the conduit 110 through one end of the cylinder 94.

Thus, as the bucket is being rolled back or pivotally moved from the second or "dumped" position, through actuation of the manual control lever 78 to the right as viewed in FIG. 2, the sleeve will eventually become aligned with the port 144 connecting the branch path 120a to the cylinder 92 to thereby block flow of fluid through the branch path.

Normally, the manual control lever will be moved sufficiently to place the detent 134 into the groove 132 and the control valve spool 74 will thereby be maintained in an actuated position. However, by setting the pressure required for opening relief valve 126 at a level higher than that required for overcoming spring 136, the blocking of the branch port or branch path 120a will cause an increase in pressure of the fluid in the closed circuit to move the valve spool 74 from its detented to its neutral position. Alternatively, if the operator happens to be manually holding the valve spool in an actuated position for moving the bucket from the dumped to the "roll-back" position, blocking of the port 144 will cause a pressure increase in the system sufficient to be an indicator to the operator that the implement is at the desired intermediate position and he can thereby immediately release the control lever. Of course, release of the control lever will cause the self-centering spool of the control valve to move to its neutral position.

Additionally, by providing the two branch paths with the respective relief valves 124 and 126 at different pressure settings, the operator may manually override the intermediate or "return-to-dig" position by applying a sufficient pressure to the control system (by movement of the control lever in a clockwise direction as used in FIG. 2) to open the relief valve 126 and accommodate further pivotal movement from the intermediate position of the implement toward the second maximum position of the implement. After the initial pivotal movement of the implement toward the support or vehicle, the port 144 will be opened to allow further flow of fluid through branch conduit 120a.

According to a further aspect of the present invention, both of the branch paths 120a and 120b are blocked when the implement reaches the first maximum position to prevent any further manual control or actuation of the valve 74 in a direction to allow movement of the implement beyond the first maximum position. The means for accomplishing the above includes the specific location of the port 144 connecting branch path 120a to the cylinder 92 and a location of a second port 146 between the rod end side of cylinder 92 and the port 144. Thus, the port 146 will first become blocked by the piston 94a, but at this point, nothing will occur since the conduit 108 is still adapted to be connected to the conduit 110 through the first branch 120a of the second flow path 120. However, with the port 144 connecting branch path 120a to the cylinder 92 located so that the piston 94a will block the port 144 when the implement reaches the first maximum position, the fluid in conduit 108 and the respective ends of the cylinders 92 and 102 is trapped and the incompressibility of the fluid prevents the manual control lever to be moved to actuate the valve spool to the rollback position.

According to a further aspect of the present invention, the hydraulic circuit further includes means for supplying additional fluid to the closed system whenever required. For this purpose, the flow path 120 is connected through a conduit 150 to a source of fluid 152 and the flow path has a further check valve 154 disposed therein which has a relatively low setting. With this arrangement the fluid in the source 152 will constantly replenish any loss of fluid within the closed circuit including the conduits 108, 110, the master cylinder 92, the slave cylinder 102 and the control valve with its associated flow passages.

If desired the master cylinder and piston assembly 90 may further include a sight indicator 160 for visually indicating the approximate position of the implement relative to the bucket. The sight indicator could include a suitable indicating device 162 and have the extension 142 extending through the head end of the cylinder 92 with the position of the bucket thereby automatically being indicated by the movement of the extension.

Figure 4:
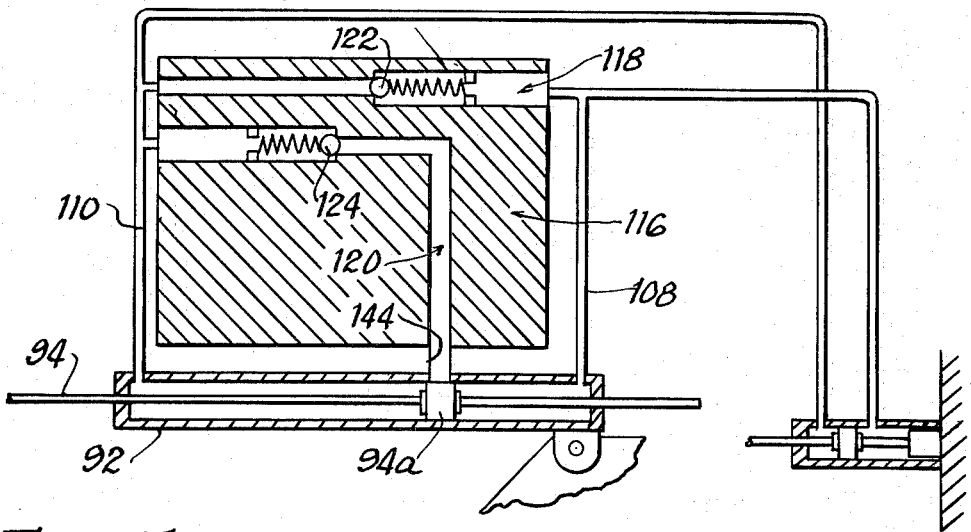
FIG. 4 is a fragmentary schematic illustration of the control circuit capable of performing a second function.

The operation of the hydraulic control circuit of the present invention will be described in connection with each individual function performed by the control circuit, with particular reference to FIGS. 3–5. FIG. 3 shows the components for maintaining the implement or bucket in a fixed angular relation to a reference plane while the implement is being raised and lowered relative to the vehicle (self-leveling). Assuming that no fluid is being directed to the implement ram 42 and fluid is being directed to the head end of fluid ram 24, the boom 20 will be raised and the fixed relationship of the parellelogram linkage will cause the bucket to be tilted rearwardly as the boom is being raised. This will cause a movement of the pivotal connection 48 toward the support and move piston 94a within cylinder 92. The relative movement of the elements 94a and 92 will force fluid trapped within the closed loop to be diverted from the head end of cylinder 92 to the corresponding end of cylinder 102 thereby moving piston 104 and the valve spool toward the dump position to supply pressure fluid to the head end of cylinder 44. This movement will continue until the bucket is at the predetermined angular relationship. It should be noted that this will occur even though the valve spool 74 is biased to a neutral position because the pressure required to overcome the bias on the spool is less than the pressure required to open relief valves 122 and 124.

Of course, movement of the boom in the opposite direction, would move the valve spool toward the rollback position and again automatically maintain the implement or bucket at a leveled condition.

At any time during the movement of the bucket, the operator may manually override the automatic leveling control by mere actuation of the control lever 78. Such actuation will produce a sufficient force to open either of relief valves 122 or 124, dependent upon the direction of movement of spool 74 to allow the operator to reset the position of control. It will be appreciated that the operator may set any desired position of control between the first and second maximum or rollback and dump positions for the implement by mere manipulation of the manual lever. Once the position has been established, the operator need only release the control lever and self-centering spool 74 will move to its neutral position. Thereafter, the angular position of the implement or bucket when the valve reaches neutral will be maintained while the boom or left arms 20 are being raised and lowered.

The theory of preventing the implement from moving beyond a first maximum angle relative to a fixed referenced plane will be described in connection with FIG. 4. The illustrated elements necessary for preventing the bucket from moving beyond the "maximum rollback position" are shown in FIG. 4 where it will be noted that the flow path 120 is shown as communicating with the conduit 108 through a port 144 adjacent the head end of the cylinder 92. Assuming that the manual control 78 has been moved to place the valve spool 74 to the rollback position, when the implement reaches the maximum rollback angle, the piston 94a will be in axial alignment with the port 144 and will block the port to lock the elements 94, 94a and 92 of the fluid ram 90 relatively to each other to prevent any further manual control. As was indicated above, once the flow path 120 is blocked, the fluid in conduit 108 and the associated ends of the cylinder 104 and 92 is trapped to prevent actuation of the control valve spool 74 to the rollback position.

Figure 5:
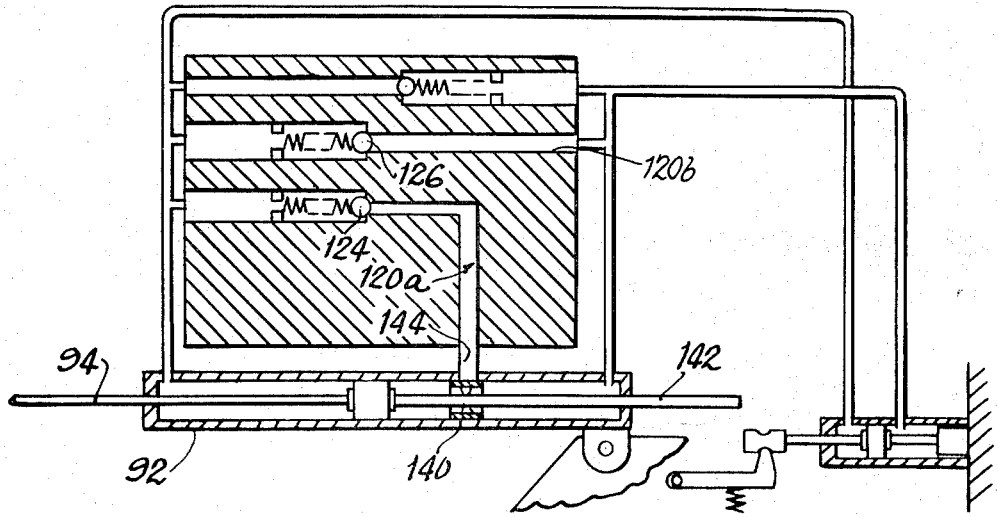
FIG. 5 is schematic illustration of the control circuit for performing a third function.

The operation of automatically returning the implement to a working position or more specifically, the bucket to a return-to-dig position is shown in FIG. 5. During normal operation of the implement, after the bucket has been dumped the operator generally moves the valve spool 74 to a detented rollback position so that he may release the control lever and direct his attentions to other functions which are required to be performed. Thus, as the implement is being pivoted or tilted from the second maximum position toward the first maximum position, the piston rod 94 will be retracting within the cylinder 92 and the sleeve 140, being fixed to the extension 142 will likewise be moving toward the head end of the cylinder. When the sleeve 140 is in axially alignment with the port 144, the flow of fluid from conduit 108 to conduit 110 is interrupted. Thus, by having the spring force on relief valve 124 lower than the spring force on the detent 134 and the spring force on relief valve 126 higher than that on detent 134, the pressure in conduit 108 will increase and will be sufficient to release the detent 134 and allow the self-centering valve spool 74 to move to the neutral position. However, the branch path 120b will still allow the operator to manually override the control mechanism by applying a sufficient force to control lever 70 to open relief valve 126. Also, as was indicated above, if the operator should be holding the control lever 78 rather than having the valve spool in its detented position, the blocking of the port 144 will increase the pressure in the conduit 108 and this pressure will be transmitted through the control valve spool 74 to the control lever to act as an indicator to the operator that the implement is at the working or return-to-dig position.

It should be noted at this point while the means for blocking flow between the conduits to stop the implement at its working position and to prevent movement of the implement beyond a maximum position, have been shown as being incorporated into the cylinder and piston rod assembly 90, it will readily be appreciated that various mechanisms could be utilized for blocking the flow in the respective flow paths 120a and 120b. For example, the two flow paths could be placed directly between the conduits and suitable pressure responsive mechanism could be placed in the respective flow paths to close the flow paths when the pressure reaches the desired level. However, for purposes of simplicity, the illustrated embodiment of the control valve 116 shown in FIG. 2, considerably simplifies the number of components required for simultaneously performing the three desired functions. Thus, by proper arrangement of the ports 144 and 146, the port 144 can be blocked by sleeve 140 to stop the implement at its working position, while the piston 94a may be utilized for simultaneously blocking both ports 144 and 146 when the implement reaches the first maximum angle.

The vehicle 10 as well as the particular hydraulic linkage mechanism shown in FIG. 1 has been illustrated merely for purposes of illustration and is not considered to be limited to the elements described. For example, the hydraulic control linkage 32 could readily be a fluid ram interposed directly between the boom 20 and the bucket 28. Also, the vehicle 10 need not be of the articulated type.

As can be seen from the above description, the present invention provides a simple and effective hydraulic control linkage for automatically controlling the position of the control valve and simultaneously performing a plurality of functions. The components required are inexpensive and easily incorporated into existing earthworking devices. The arrangement allows for the elimination of any direct mechanical connection between the relatively movable implement and the relatively fixed valve. To reiterate, the connection between the implement and the valve is in the form of flexible hosing which eliminates the need for mechanical linkage heretofore required for controls of this type.

What is claimed is:

1. A material handling device comprising a vehicle having one end of a boom pivotally supported thereon with a material handling implement movable on the opposite end of said boom; hydraulic means for moving said implement on said boom and including a fluid motor having relatively movable elements, respectively, connected to the boom and the implement; said hydraulic means further including a fluid source under pressure, a reservoir, a valve and conduit means interconnecting said valve, motor, source and reservoir; said valve having a spool slidable in a chamber and movable in opposite directions from a neutral position to move said implement in opposite directions on said boom, the improvement of a hydraulic control linkage means interposed between said spool and said implement for causing actuation of the spool and consequently (1) maintaining said implement at a predetermined angle relative to a fixed reference plane during raising of said boom; (2) preventing movement of said implement beyond a first maximum angle relative to said reference plane; and (3) returning said implement to a desired angle relative said reference plane after said implement has been moved to a second maximum angle.

2. A material handling device as defined in claim 1, in which said hydraulic control linkage means further includes means defining a chamber adjacent said spool; a slave piston slidable in said chamber and connected to said spool; a piston rod and cylinder assembly having elements respectively connected to said vehicle and said implement and conduit means connecting opposite ends of said cylinder to opposite ends of said chamber with hydraulic fluid in said conduit means, said cylinder and said chamber whereby relative movement between said elements will actuate said valve.

3. A material handling device as defined in claim 2, in which said hydraulic means includes manual means for moving said valve spool, the further improvement of means in said hydraulic control linkage means for allowing said valve spool to remain in a manually actuated position by accommodating movement of said elements while said slave piston is in a fixed position.

4. A material handling device as defined in claim 3, including the further improvement of mechanism in said hydraulic control linkage means for locking said elements relative to each other when said implement is at said first maximum angle.

5. A material handling device as defined in claim 4, including biasing means normally maintaining said valve spool in a neutral position and biased detent means maintaining said valve spool in an actuated position for moving said implement from said second maximum angle toward said first maximum angle; the further improvement of means in said hydraulic control linkage means for returning said valve spool to said neutral position when said implement reaches said desired angle.

6. A material handling device as defined in claim 2, in which said conduit means includes first and second conduits having opposite ends respectively connected to opposite ends of said cylinder and said chamber, the further improvement of a flow control valve defining first and second unidirectional flow paths in opposite directions and biased valve means in said flow paths normally blocking flow through said flow paths, said valve means accommodating flow in opposite directions between said conduits upon manual actuation of said valve spool in opposite directions from said neutral position.

7. A material handling device as defined in claim 6, the further improvement of mechanism for blocking flow through one of said flow paths when said implement reaches said first maximum angle.

8. A material handling device as defined in claim 6, in which said second flow path includes first and second parallel branch paths between said conduits, each having biased valve means therein; means for blocking flow through said first branch path when said implement reaches said desired angle to return said valve spool to said neutral position, said second branch path accommodating flow between said conduits upon subsequent manual actuation of said valve spool; and means blocking both branch paths when said implement reaches said first maximum angle.

9. In a vehicle having a boom pivoted on a support between raised and lowered positions, an implement pivoted on said boom, power means for pivoting said implement on said support between first and second positions, a control valve having a self-centering spool movable in opposite directions from a neutral position to direct fluid to and from said power means and pivot said implement, the improvement of separate hydraulic linkage means between said support, said implement and said valve spool for automatically moving said spool to any one of said positions and maintain said implement at a predetermined angle relative to a fixed reference plane during raising and lowering of said boom, said hydraulic linkage means including means for preventing actuation of said valve spool when said implement reaches said second position.

10. A vehicle as defined in claim 9, in which said hydraulic linkage means includes a slave cylinder and slave piston cooperating with said spool, and means interposed between said support and said implement for moving said slave piston in said slave cylinder in response to movement of said implement relative to said support.

11. A vehicle as defined in claim 10, in which said last means includes a master cylinder connected to said support and a master piston connected to connected implement; and conduits interconnecting opposite ends of said cylinders.

12. A vehicle as defined in claim 9, in which said hydraulic linkage means includes an assembly having cylinder and piston elements respectively connected to said support and said implement and means operatively connecting opposite ends of said cylinder element to said spool to move said spool in response to movement of said piston element relative to said cylinder element.

13. A vehicle as defined in claim 9, in which said hydraulic linkage means includes a master cylinder having a master piston slidable therein and interposed between said support and said implement; a slave cylinder having a piston slidable therein and connected to said spool; and first and second conduits connecting opposite ends of said cylinders, said conduits defining first and second closed fluid paths between opposite ends of the respective pistons.

14. A vehicle as defined in claim 13, including the further improvement of valve means interposed between said fluid paths and operative upon manual actuation of said spool in opposite directions from a neutral position to allow independent movement of said bottom.

15. A vehicle as defined in claim 14, in which said valve means defines first and second normally closed flow paths between said fluid paths and biased means in said flow paths responsive to manual movement of said spool to open said flow paths.

16. A vehicle as defined in claim 15, in which one of said flow paths has first and second parallel branch paths, each having valves normally blocking flow therein, said valves respectively being responsive to first and second pressures of fluid in one of said fluid paths, to connect said one of said fluid paths with the other fluid path.

17. In combination with a vehicle having one end of a boom pivoted thereon and an implement pivoted on the opposite end of the boom between first and second positions by a fluid motor supplied with fluid through a valve having a spool biased to a neutral position, a hydraulic control linkage interposed between the vehicle, implement and valve spool and comprising a master piston and cylinder assembly having elements respectively connected to the vehicle and implement; a slave piston and cylinder assembly cooperating with said valve spool; and first and second conduits interconnecting respective ends of said cylinder elements and having hydraulic fluid therein whereby movement of said implement toward and away from said vehicle will actuate said valve in opposite directions from said neutral position to maintain said implement in a level position relative to said vehicle while the boom is raised and lowered on the vehicle.

18. The combination as defined in claim 17, the further improvement of valve means between said conduits defining first and second flow paths between said conduits with relief valves in said paths and responsive to a first pressure of said hydraulic fluid in said respective conduits to provide flow in opposite directions between said conduits to accommodate manual actuation of said valve spool.

19. The combination as defined in claim 18, including the further improvement of means for blocking flow in one of said paths when said implement reaches said first position to prevent manual actuation of said valve spool.

20. The combination as defined in claim 18, including the further improvement of one of said flow paths having first and second branch paths with said relief valve of said flow path located in said first branch path, a further relief valve in said second branch path and being responsive to a second pressure greater than said first pressure; and means for blocking flow in said first branch path to position said implement in an intermediate position between said second and level positions, said further relief valve accommodating flow between said conduits upon subsequent manual actuation of said spool to accommodate movement of said implement from said intermediate position to said first position.

21. The combination as defined in claim 20, including the further improvement of means blocking flow in both branch paths when the implement reaches said first position to prevent manual actuation of said valve spool for movement beyond said second position.

* * * * *